United States Patent [19]

DeCarolis

[11] Patent Number: 4,621,718

[45] Date of Patent: Nov. 11, 1986

[54] RATCHET SCREWDRIVER

[75] Inventor: Joseph P. DeCarolis, Bristol, Conn.

[73] Assignee: Stanley Works, New Britain, Conn.

[21] Appl. No.: 445,263

[22] Filed: Nov. 29, 1982

[51] Int. Cl.[4] ........................ F16D 41/08; B25B 15/00; B25B 15/04

[52] U.S. Cl. ........................................ 192/43; 29/434; 29/525; 81/63.1

[58] Field of Search ........................ 192/43.2, 43, 43.1, 192/44; 81/60, 63.1; 145/70, 72, 73, 75, 76; 29/434, 525; 403/315, 316

[56] References Cited

U.S. PATENT DOCUMENTS

| | | | |
|---|---|---|---|
| 593,157 | 11/1897 | Furbish | 192/43 |
| 814,528 | 3/1906 | Furbish | 145/73 |
| 930,169 | 8/1909 | Exley | 403/316 X |
| 1,815,660 | 7/1931 | Walker | 403/315 X |
| 2,201,492 | 5/1940 | Jagler | 192/43.1 |
| 2,377,046 | 5/1945 | Siegerist | 403/356 |
| 2,466,097 | 4/1949 | Graue | 403/356 |
| 2,566,517 | 9/1951 | Dicks | 403/316 X |
| 2,664,002 | 12/1953 | Anderson | 403/315 X |
| 2,720,296 | 10/1955 | Briglia | 192/43.1 |
| 3,332,117 | 7/1967 | McCarthy | 403/315 |
| 3,517,953 | 6/1970 | Wright et al. | 403/316 |
| 3,554,251 | 1/1971 | McLogan | 145/75 |
| 3,844,322 | 10/1974 | Stoutenberg | 403/316 X |
| 4,118,134 | 10/1978 | Mansel | 29/525 X |
| 4,222,462 | 9/1980 | Ottlestad | 403/316 X |

FOREIGN PATENT DOCUMENTS

| | | | |
|---|---|---|---|
| 469959 | 3/1974 | Australia | 81/63.1 |
| 602830 | 9/1934 | Fed. Rep. of Germany | 145/76 |
| 810619 | 8/1951 | Fed. Rep. of Germany | 145/76 |
| 357845 | 11/1930 | United Kingdom | 145/75 |
| 1361466 | 7/1974 | United Kingdom | 145/76 |

*Primary Examiner*—Rodney H. Bonck
*Attorney, Agent, or Firm*—Prutzman, Kalb, Chilton & Alix

[57] ABSTRACT

A rotary hand tool of the ratchet type and method for assembling same comprises an elongated wide mouth ratchet housing provided with a shaft rotatably mounted therein having a ratchet mechanism operatively associated therewith and a bushing coaxially mounted on the shaft, which bushing interlocks with the housing for securing the shaft and ratchet mechanism within the housing and aligning and supporting the shaft.

14 Claims, 6 Drawing Figures

FIG. 5
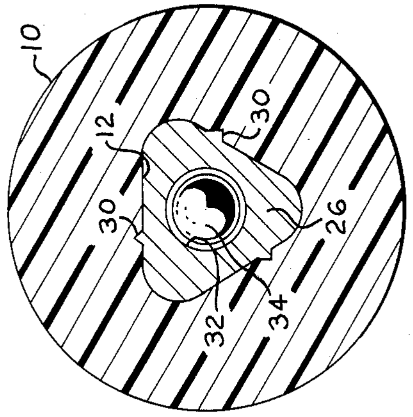
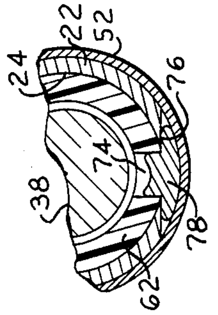
FIG. 6
FIG. 4
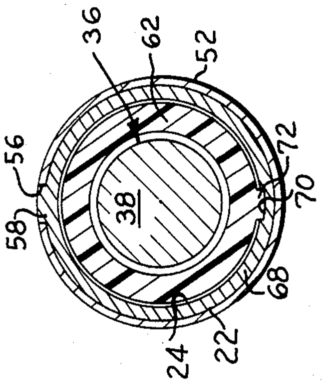

RATCHET SCREWDRIVER

TECHNICAL FIELD

The present invention relates generally to rotary hand tools of the reversible ratchet type, and is more particularly concerned with a new and improved ratchet housing assembly for rotary hand tools such as screwdrivers and the like and with their method of assembly.

BACKGROUND OF THE INVENTION

In the rotary hand tool art and particularly within those devices employing a reversible ratchet mechanism, there exist ratchet housing assemblies of the closed-end type. These housings frictionally retain a bearing, such as a ball bearing, at the closed end of the housing's axial cavity for engagement by the shaft of the rotary hand tool. In such tools it is necessary to provide an aligning and supporting structure at an intermediate location along the length of the shaft remote from the end engaging the ball bearing. This aligning and support function can be provided by the housing in those structures where the ratchet wheel of the mechanism is no larger than the diameter of the rotatable shaft. However, in most instances, the ratchet wheel has a substantially larger diameter than the shaft and consequently an enlarged cavity mouth is required for permitting insertion of the wheel and shaft into the ratchet housing cavity. The enlarged mouth prevents the housing, by itself, from performing the necessary aligning and supporting functions. It is also necessary to provide the mechanism with a suitable means for limiting the axial movement of the shaft, thus assuring proper and efficient operation of the hand tool. Additionally, in many such tools the ratchet mechanism is enclosed by an exterior sleeve that must be secured to the ratchet mechanism housing by means of fasteners such as screws or the like in order to maintain the components in a secure, assembled and operative condition. The use of such fasteners frequently complicates and prolongs the manufacturing and assembling of such tools, resulting in higher overall costs and frequently permitting premature loosening of the assembly, thus limiting the useful life of the tool.

SUMMARY OF THE INVENTION

In accordance with the present invention it has been found that a new and improved ratchet housing assembly can be provided for use in connection with wide-mouth ratchet housings which not only provide the desired shaft aligning and supporting functions but also limit the axial movement of the shaft and provide secure and rapid assembly including mounting of the exterior sleeve enclosure, all without the use of threaded fasteners. This rapidly assembled and interlocked structure can be securely embedded within the handle of the tool in a facile and rapid manner to provide both economy of manufacture and durability in use.

Other advantages will be in part obvious and in part pointed out more in detail hereinafter.

These and related features of the present invention are achieved by providing a ratchet mechanism housing assembly for hand tools and the like that comprises a drive shaft having an enlarged diameter ratchet wheel fixedly mounted thereon, an elongated housing having an axially extending cavity closed at one end and provided at its opposite end with an enlarged mouth of a size suitable for ready insertion of the shaft and ratchet wheel therethrough and a bearing positioned within said cavity at the closed end with one end of the shaft engaging the bearing while positioning the ratchet wheel within the cavity. The shaft extends through the enlarged mouth of the housing and outwardly thereof, while a shaft aligning bushing is coaxially mounted on the shaft and cooperates with the housing to enclose the cavity at its enlarged mouth. The bushing and housing further include mating interlocking means for preventing relative axial movement therebetween.

In accordance with the method of the present invention, the bushing preferably is mounted on the shaft prior to securing the ratchet wheel thereon. The shaft-ratchet-bushing subassembly is then mounted within the housing's axial cavity in operative engagement with a ball bearing positioned therein and the bushing is secured to the housing by means of an interlocking arrangement provided on both the bushing and housing. The ratchet actuator and associated mechanism is mounted in the housing and the mechanism is enclosed by a tubular sleeve that is keyed to the housing prior to insertion of the entire assembly within a tool handle.

A better understanding of the objects, advantages, features, properties, and relationships of the invention will be obtained from the following detailed description of the several steps of the process together with the relation of one or more of such steps with respect to each of the others and of the article shown in the accompanying drawings which set forth an illustrative embodiment and are indicative of the way in which the principals of the invention are employed.

BRIEF DESCRIPTION OF THE DRAWINGS

FIG. 4 is an enlarged sectional view taken along line 4—4 of FIG. 1;

FIG. 5 is an enlarged sectional view taken along line 5—5 of FIG. 1; and FIG. 6 is a fragmentary sectional view taken along line 6—6 of FIG. 2.

DETAILED DESCRIPTION

Figure 1:
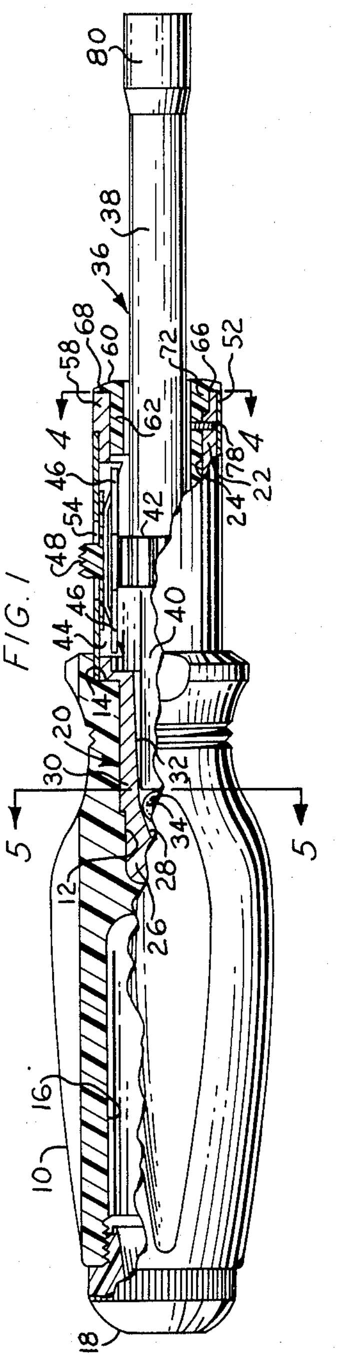
FIG. 1 is a side view, partially broken away and partially in section, of a rotary hand tool of the ratchet type embodying the features of the present invention.
Figure 3:
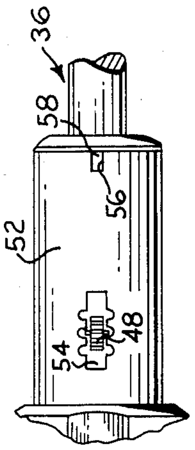
FIG. 3 is a top view of the ratchet housing assembly of FIG. 1 illustrating the interlock of the sleeve with the housing.

Referring now to the drawings in greater detail wherein like reference numerals indicate like parts throughout the several figures, a rotary hand tool of the ratchet type is illustrated in FIG. 1 as comprising an elongated handle or grip 10 having a first generally triangular (FIG. 5) axial bore 12 with a circular shaped entrance recess 14 at the forward end thereof. The rear of handle 10 may, if desired, be provided with a rearwardly opening axial bore 16 forming a storage cavity that may be closed such as by a threadably removable end cap 18. The bore 12 and entrance recess 14 are adapted to securely receive therein a ratchet housing 20 incorporating the features of the present invention. As can be seen, the ratchet housing 20 comprises a hollow substantially cylindrical first housing portion 22 having an axially extending cavity 24 therein and an integral triangular shaped extension 26 projecting rearwardly from portion 22. The extension 26 is provided with an axial bore 32 that communicates coaxially with the axially extending cavity 24 in first housing portion 22 and terminates in a closed end wall 28 within the interior of extension 26 in such a manner as to receive therein a ball bearing 34 that rests against the terminal end wall 28 of bore 32. Triangular extension 26 is provided with a plurality of exterior, axially extending teeth 30 and is sized with respect to triangular bore 12 such that as the housing 20 is mounted in the handle the teeth 30 cut into the walls of bore 12 so that the extension 26 is tightly and securely held against removal therefrom. The handle 10 may be made of any suitable material such as a moldable resin while the ratchet housing 20 preferably is made of metal.

The tool includes an elongated rotatable shaft 36 having a forward shank portion 38 and a rear shank portion 40 of uniform and reduced diameter relative to portion 38. The shaft 36 extends through the axial cavity 24 of housing portion 22 and into bore 32 wherein the free end of rear shank portion 40 bears against the ball bearing 34. Rear portion 40 is knurled at a point adjacent to portion 38 and is adapted to receive ratchet wheel 42 in a press fit manner. The ratchet wheel 42 is operatively positioned within housing portion 22 at a point about midway along the length of an axially extending peripheral aperture or slot 44 in ratchet housing portion 22. A pair of ratchet pawls 46 are positioned in the aperture 44 for selectively engaging the teeth of ratchet wheel 42 so as to provide for forward, reverse or combination drive in a conventional manner. The pawls 46 are selectively engaged with and disengaged from the teeth of the ratchet wheel 42 by means of a slidable thumb actuator 48 also operatively positioned within the longitudinal aperture 44 of housing portion 22.

A thin cylindrically shaped sleeve 52 is slidably mounted on and circumscribably encloses housing portion 22 and the ratchet mechanism housed therein. The sleeve 52 is provided with the usual actuator slot 54 through which actuator 48 projects and with a keyway 56 at its forward end that is adapted to mate with a projecting key 58 on the forward end of housing portion 22 to limit forward and rotational movement of the sleeve relative to the housing. The diameter of the ratchet housing 20 and the thickness of sleeve 52 are such that they fit tightly within entrance recess 14 in handle 10 thereby locking the sleeve 52 in place.

Figure 2:
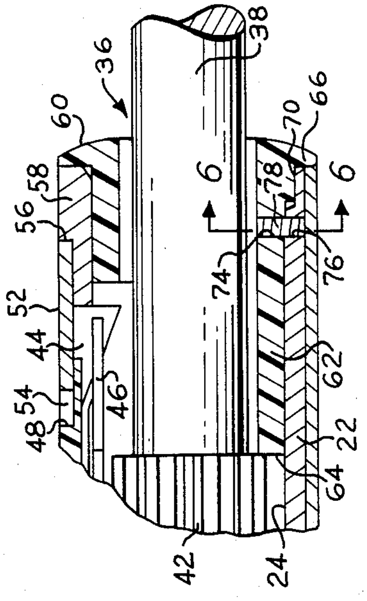
FIG. 2 is an enlarged sectional view of the forward end of the ratchet housing assembly of FIG. 1.

Referring now to FIGS. 2, 4 and 6, an elongated bushing 60 having a tubular cylindrical body portion 62 is mounted within the cavity 24 of ratchet housing portion 22 such that its innermost end 64 abuts the side of ratchet wheel 42 so as to bias the shaft 36 against ball bearing 34 thereby preventing axial movement of the shaft 36. The internal diameter of the bushing is only slightly larger than the diameter of forward shank portion 38, typically by about 0.005 inch, to permit free rotation of the shaft 36 while providing the desired aligning and supporting function for the shaft. Body portion 62 of bushing 60 is provided on the outermost end thereof with a circumferential, radially outwardly projecting flange 66 adapted to seat against the end wall 68 of ratchet housing portion 22. A keyway 70 is provided on the interior surface of housing portion 22 at end wall 68 for cooperative engagement by key 72 located on the outer surface of bushing 60 adjacent the flange 66. As best seen in FIG. 4, the interior keyway 70 is spaced diametrically from the sleeve retaining exterior key 58 and fixedly secures the bushing 60 against rotational movement within the housing 20. The ratchet housing 20 and bushing 60 are each provided with opposed slots, 74 and 76 respectively, at a location spaced from flange 66 and end wall 68 for receiving a segment stop 78 (see FIG. 6) in order to prevent relative axial movement between the bushing 60 and the housing 20.

As can clearly be seen from the foregoing detailed description, the rotary hand tool of the present invention is readily and easily assembled without the need of fasteners. In accordance with the method of the present invention, the bushing 60 is mounted on the forward shank portion 38 of the shaft 36 before the ratchet wheel 42 is press fit thereon since the internal diameter of the bushing is too small to fit over the enlarged head 80 on the free end of shank portion 38. The ratchet wheel-shaft-bushing subassembly is then placed within the cavity 24 of housing portion 22 and the bushing 60 is positioned in place within housing 20 such that the key 72 and keyway 70 interlock and the end of rear shank portion 40 abuts the ball bearing 34. Stop 78 is then located in the slots 74 and 76. The pawls 46 and thumb actuator 48, which may be assembled either immediately prior to or after locking the bushing 60 to the housing are positioned within the housing and the sleeve 52 is slidably mounted on the housing portion 22 such that key 58 and keyway 56 cooperatively interengage. The entire housing assembly is therafter pressed into bore 12 and entrance recess 14 provided in the handle 10 with ribs embedding into the wall of bore 12.

As can be seen from the foregoing, the rotary hadn tool of the present invention and the method of its assembly provide a tool which is easily and rapidly assembled by interlocking the component parts thereof without the need of fasteners. At the same time, the forward shank portion 38 of the shaft 36 is coaxially aligned and supported within the axial cavity 24 of the housing with the innermost end 64 of the bushing 60 bearing against ratchet wheel 42 to prevent axial movement of the rotatable shaft relative to the housing.

It is to be understood that the invention is not limited to the illustrations described and shown herein, which are deemed to be merely illustrative of the best mode of carrying out the invention, and which are susceptible to various modifications, adaptations and variations of form, size arrangement of parts and details of operation which can be made without departing from the teachings of the present invention.

I claim:

1. A ratchet mechanism housing assembly for hand tools and the like comprising a drive shaft having an enlarged diameter ratchet wheel fixedly mounted thereon, an elongated housing having an axially extending cavity that is closed at one end and at end opposite the closed end is provided with an enlarged mouth of a size suitable for ready insertion of the shaft and ratchet wheel therethrough, a bearing positioned within said axial cavity at said closed end, said shaft being positioned within said cavity in engagement with said bearing and said ratchet wheel being positioned fully within said cavity, said shaft extending through said enlarged mouth and outwardly thereof, a shaft aligning bushing coaxially mounted on said shaft and cooperating with said housing to enclose said cavity at said enlarged mouth, said bushing and housing including mating opposed slots, a segment stop member extending through one of said slots into the opposite slot for preventing relative axial movement between said bushing and said housing, interlocking means between said bushing and said housing for preventing relative rotational movement therebetween, and enclosure means for retaining said segment stop between said bushing and said housing.

2. The housing assembly of claim 1 wherein said bushing operatively cooperates with said ratchet wheel so as to limit axial movement thereof relative to said housing.

3. The housing assembly of claim 2 wherein said bushing includes a hollow cylindrical main body portion and a circumferential flange on one end of said body portion, said circumferential flange engaging said opposite end of said housing at said enlarged mouth and said body portion abutting said ratchet wheel to prevent axial movement of said drive shaft relative to said housing.

4. The housing assembly of claim 3 wherein said enclosure means includes an outer sleeve mounted on said housing with one end abutting the circumferential flange of the bushing.

5. The housing assembly of claim 1 including a sleeve mounted on said housing for circumferentially enclosing said housing, said sleeve being provided with interlocking means adapted to mate with corresponding interlocking means provided on said housing to prevent relative rotational movement therebetween.

6. The housing assembly of claim 1 wherein one of said opposed slots and said interlocking means are provided on said housing adjacent said enlarged housing mouth.

7. The housing assembly of claim 1 wherein said interlocking means includes a keyway on one of said housing and said bushing and a complementary key on the other of said housing and bushing cooperating to prevent relative rotational movement therebetween.

8. A rotary hand tool comprising an elongated housing, a shaft rotatably mounted within said housing, a ratchet mechanism positioned within said housing and having at least a portion thereof corotatably secured to said shaft, bushing means coaxially mounted on said shaft and fixedly received against rotational movement within said housing wherein said bushing means includes a slot in mating relationship with a corresponding slot provided on said housing, a segment stop member extending through one of said slots into the opposite slot to prevent relative axial movement therebetween and enclosure means for retaining said segment stop between said bushing and said housing.

9. A rotary hand tool according to claim 1 wherein said bushing abuts said ratchet mechanism so as to prevent axial movement thereof with respect to the housing.

10. A rotary hand tool according to claim 8 wherein said bushing means comprises a hollow cylindrical body having a circumferential flange on one end thereof wherein said circumferential flange seats on one end of said housing and said body abuts said ratchet mechanism.

11. A rotary hand tool according to claim 10 wherein said slot on said bushing means is provided adjacent to said circumferential flange.

12. A method of assembling a rotary hand tool of a ratchet type comprising providing a housing having a closed end cavity and an enlarged mouth, a rotatable shaft, a shaft alignment bushing and a ratchet wheel, positioning said bushing on said shaft, securing said ratchet wheel on said shaft corotatably therewith to form a ratchet wheel-shaft-bushing subassembly and securing said subassembly within said housing wherein said bushing is received in said housing such that said bushing covers the enlarged mouth of said housing, engaging interlocking means between said housing and said bushing for preventing relative rotational movement therebetween, inserting a segment stop member through opposed slots in said housing and said bushing for preventing relative axial movement therebetween, and mounting an outer sleeve on said housing for retaining said segment stop in position between said bushing and said housing.

13. The method of claim 12 wherein the step of mounting said outer sleeve includes interlocking said sleeve on said housing after securing said subassembly within said housing.

14. The method of claim 12 including providing a handle having an axial bore and press fitting the housing assembly within said bore.

* * * * *

UNITED STATES PATENT AND TRADEMARK OFFICE

CERTIFICATE OF CORRECTION

PATENT NO. : 4,621,718

DATED : November 11, 1986

INVENTOR(S) : Joseph P. DeCarolis

It is certified that error appears in the above-identified patent and that said Letters Patent is hereby corrected as shown below:

col. 4, line 54, add "the" after "and at"

Col. 5, line 22, delete "including" and replace with "wherein said enclosure means includes"

col. 6, line 6, after "claim" change "1" to "8"

Signed and Sealed this

Twenty-first Day of April, 1987

*Attest:*

DONALD J. QUIGG

*Attesting Officer*

*Commissioner of Patents and Trademarks*